H. FRANKEL.
EXTENSION ATTACHMENT FOR TESTING CLIPS.
APPLICATION FILED APR. 20, 1916.
1,221,524.
Patented Apr. 3, 1917.
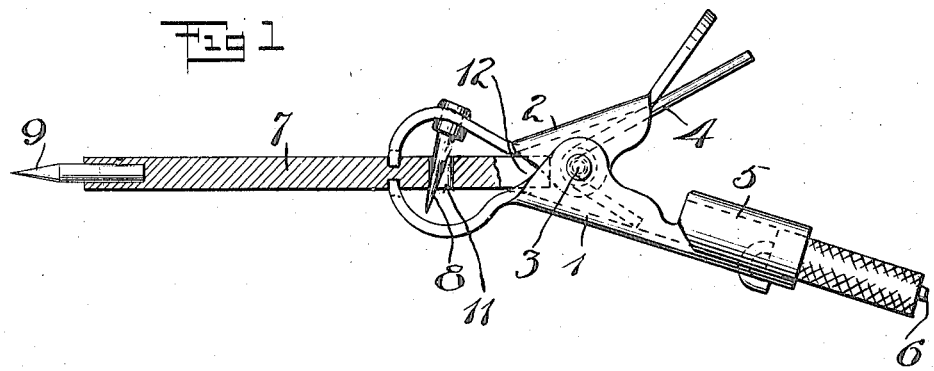
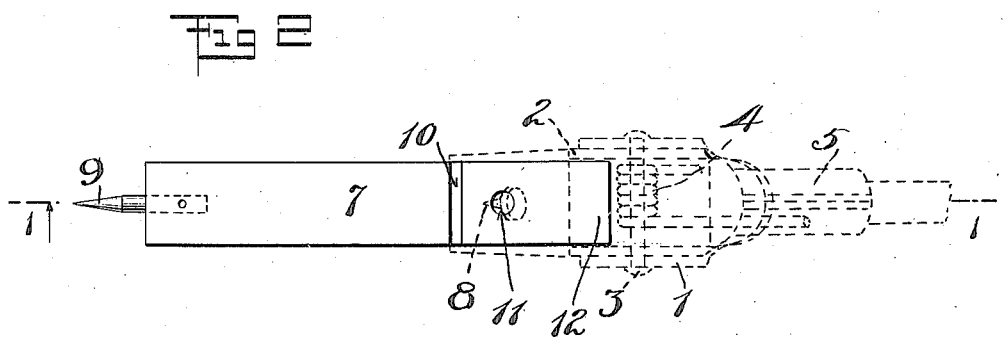
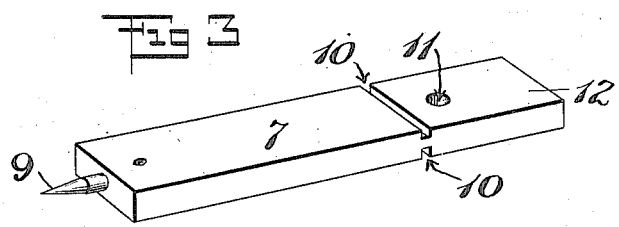
Inventor,
Harry Frankel,
By his Attorneys
Mitchell & Allen.

UNITED STATES PATENT OFFICE.

HARRY FRANKEL, OF NEW YORK, N. Y., ASSIGNOR TO FRANKEL CONNECTOR COMPANY, INC., OF NEW YORK, N. Y., A CORPORATION OF NEW YORK.

EXTENSION ATTACHMENT FOR TESTING-CLIPS.

1,221,524.     Specification of Letters Patent.     Patented Apr. 3, 1917.

Application filed April 20, 1916. Serial No. 92,444.

*To all whom it may concern:*

Be it known that I, HARRY FRANKEL, a citizen of the United States of America, residing at New York, N. Y., have invented a new and useful Extension Attachment for Testing-Clips, of which the following is a specification.

My invention relates to improvements in electrical testing instruments and is essentially an improvement upon the structure set forth in my former Patent No. 775,284 of November 15th, 1904. The object of the present invention is to provide an improved appliance or extension which is arranged to coöperate with a spring testing clip whereby tests may be made in places now inaccessible to such devices. It frequently happens that there are pockets and corners wherein it is desired to make tests, where the usual testing clip can not be used, and it is to gain ready access to such places that my present invention is intended.

In the drawings:

Figure 1 is a side elevation of my instrument partly in section on the line 1—1 of Fig. 2.

Fig. 2 is a plan view partly in dotted outline.

Fig. 3 is a perspective view of a detail.

1 represents the main body. 2 represents a companion member. The main body and companion member have overlapping cheek pieces as shown which are connected by a pivot 3. 4 is a spring for closing the jaws of the clip. 5 is a socket to which the testing wire 6 may be electrically connected. The main body member 1 has a jaw and the companion member 2 has a coöperating jaw. By these jaws the clip may be secured in place for testing purposes. 8 is a sharp pin carried by one of the jaws, for example, the jaw on the member 2, said pin projecting toward the other jaw. The function of the pin is to pierce insulation, paint or oxidation on the wire or part to which the testing instrument is to be applied, thereby securing effective electrical connection. 7 is a bar-like member of conducting material having a sharpened point 9 at one end. 10—10 are transverse grooves, one or more of which may be, and preferably are, provided in the said bar 7. 11 is a passage or perforation to the rear of the grooves 10—10. 12 is the tail end of the bar 7. The groove or grooves 10 are positioned relatively to the passage 11 so that the edges of the adjacent jaws may register therewith while the pin 8 of the clip will pass through the aforesaid passage 11. The tail end 12 projects into and preferably fits the space between the cheeks of the member 2 as shown in Figs. 1 and 2. When the extension bar 7 is put in place as shown, it will be securely held against removal and in proper alinement with the clip. The engagement between the bar and the clip is such that when the point 9 is pressed hard against the object in connection with which the test is to be made, the said bar will not twist laterally nor swing vertically, but will be so held that it constitutes practically a rigid extension of the clip enabling the operator to get into corners and other places where it would be difficult if not impossible to make a test with the clip portion alone. By providing one or more grooves 10—10 further security is afforded since the jaw end of the clip may effectively engage the bar at a point beyond the engagement by the pin 8.

What I claim is:

1. In a testing instrument, a clip element including jaws and a spring for normally closing said jaws, a sharp pin member carried by one of the jaws, a removable extension bar, the rear end of said extension engaging said clip, said extension having a passage to receive said pin, said extension being engaged by the jaws of said clip forward of said pin.

2. A testing instrument comprising a clip including two pivotally connected jaw members, a spring for normally forcing said jaw members into engagement, a pin carried by one of said jaws and directed toward the other jaw, a removable extension comprising a bar having a pointed front end, the rear end of said bar being arranged to engage said clip near its pivot, said bar having a passage therethrough for said pin forward of the rear end thereof, said jaws being arranged to engage said extension forward of the pin passage when the parts are assembled.

3. A testing instrument comprising a clip including two pivotally connected jaw members, a spring for normally forcing said jaw members into engagement, a pin carried by one of said jaws and directed toward the other jaw, a removable extension comprising a bar having a pointed front end, the rear end of said bar being arranged to engage said clip near its pivot, said bar having a passage therethrough for said pin forward of the rear end thereof, said jaws being arranged to engage said extension forward of the pin passage when the parts are assembled, and a transverse groove in the face of said bar forward of said pin passage and arranged to receive the edge of one of said jaws.

4. A testing instrument comprising a clip including two pivotally connected jaw members, a spring for normally forcing said jaw members into engagement, a pin carried by one of said jaws and directed toward the other jaw, a removable extension comprising a bar having a pointed front end, the rear end of said bar being arranged to engage said clip near its pivot, said bar having a passage therethrough for said pin forward of the rear end thereof, said jaws being arranged to engage said extension forward of the pin passage when the parts are assembled, the upper and lower surfaces of said extension having transverse grooves therein forward of said pin passage to receive the edges of both of said jaws.

5. In a testing instrument of the character described, a spring clip including jaws, a detachable extension therefor comprising a bar, a sharp point at the forward end thereof and means carried by said jaws for detachably engaging said bar therewith intermediate its length and for holding the same substantially rigid therewith.

HARRY FRANKEL.